United States Patent [19]

Hayes et al.

[11] Patent Number: 4,528,255

[45] Date of Patent: Jul. 9, 1985

[54] GRIDS FOR ELECTRIC STORAGE BATTERIES

[75] Inventors: Michael H. Hayes, Wilmslow; Ernest J. Pearson, Swinton, both of England

[73] Assignee: Chloride Group Public Limited Company, London, England

[21] Appl. No.: 547,099

[22] Filed: Oct. 31, 1983

[30] Foreign Application Priority Data

Oct. 29, 1982 [GB] United Kingdom ............... 8230957
Jul. 14, 1983 [GB] United Kingdom ............... 8319055

[51] Int. Cl.$^3$ .......................................... H01M 4/73
[52] U.S. Cl. .................................. 429/233; 429/241; 29/2; 29/623.1
[58] Field of Search ............... 29/2, 623.1; 141/32, 141/33; 429/152, 156, 157, 158, 159, 161, 233, 238, 243, 244, 246, 211, 241, 242

[56] References Cited

U.S. PATENT DOCUMENTS

| 3,453,145 | 7/1969 | Ruddy | 429/244 |
|---|---|---|---|
| 4,091,192 | 5/1978 | Scholle | 429/241 |
| 4,331,747 | 5/1982 | Julian et al. | 429/160 |
| 4,336,704 | 6/1982 | McDowell | 29/2 |

FOREIGN PATENT DOCUMENTS 1430205 3/1976 United Kingdom .
2070844 9/1981 United Kingdom .

Primary Examiner—Anthony Skapars
Attorney, Agent, or Firm—Finnegan, Henderson, Farabow, Garrett & Dunner

[57] ABSTRACT

A grid array for use in assembling a multicell electric battery comprises a plurality of grids preferably arranged in two spaced parallel lines, adapted to provide a plate for every cell of the battery. Each grid is connected to one or more adjacent grids by a combination of integral bridge pieces and sufficient temporary links to maintain all the grids of the array in their desired configuration.

24 Claims, 7 Drawing Figures

GRIDS FOR ELECTRIC STORAGE BATTERIES

The present invention relates to multicell electric storage batteries and is concerned with a method of forming grids for such batteries and with a grid array for use in assembling such batteries. The invention is concerned in particular with lead acid batteries, especially such batteries of the type containing substantially no mobile electrolyte, e.g. batteries in which the electrolyte is in gel form or recombination batteries. Recombination batteries are those which include a reduced amount of electrolyte such that there is substantially no free unabsorbed electrolyte within the battery and in which the gas evolved during operation or charging is not vented to the atmosphere but is induced to recombine within the battery.

It is an object of the present invention to provide a method of forming grids and an array of grids which may be assembled into multicell batteries in a simple and economical manner and which, in particular, will result in an efficient use of raw materials, in particular the lead or lead alloy and active material in the case of lead acid batteries.

According to the present invention a method of forming grids for multicell electric storage batteries includes casting the grids in an array arranged to provide a plate for each cell of the battery, each grid being integrally connected to one or more adjacent grids by a combination of bridge pieces and sufficient temporary links to maintain all the grids of the array in their desired configuration. The grids are preferably cast in two interconnected lines, which lines are preferably straight and parallel. In the preferred form of the invention the elongate array is cast in a continuous length which is subsequently cut into discrete lengths, each of which lengths itself constitutes an array of grids.

The invention also embraces a grid array per se and thus according to a further aspect of the present invention a grid array for use in assembling multicell electric batteries comprises a plurality of grids arranged to provide a plate for every cell of the battery, each grid being integrally connected to one or more adjacent grids by a combination of bridge pieces and sufficient temporary links to maintain all the grids of the array in their desired configuration.

The grid array is preferably cast, more preferably continuously cast. At some stage in the assembly of electric batteries it is necessary to separate the continuously cast grid strip into discrete lengths and in a preferred embodiment of the invention the grids are cast in two interconnected, preferably straight and parallel, lines. Preferably each grid is connected to the or each adjacent grid in the same line by one or more temporary links and at least some grids are connected to a grid in the other line by an integral bridge piece. In an alternative embodiment certain grids are not connected to a grid in the other line and each such grid is cast with a connecting member which extends towards but terminates short of the other line. Each such connecting member which terminates short of the other line of grids is preferably shaped such that its free end is inclined to the direction in which the lines extend. This construction enables the continuously cast strip to be cut into individual lengths without the necessity of cutting certain of the bridge pieces.

It is preferred that the grids in one line are offset in relation to those in the other line in the direction of the length of the lines, whereby a grid in one line is opposite a connection between grids in the other line.

Whilst all the grids may be identical it is preferred that certain of them differ from the remainder and in the preferred embodiment certain grids are adapted to be formed into positive plates and differ from the remainder which are adapted to be formed into negative plates. In one construction all the grids in one line are adapted to be formed into negative plates and all the grids in the other line are adapted to be formed into positive plates. Alternatively, each line may include one or more plates adapted to be formed into negative plates alternating with the same number of plates adapted to be formed into positive plates. In this case, it is preferred that each grid in each line is integrally connected to or otherwise associated with a grid of the opposite polarity in the other line. A battery may be manufactured from a plurality of grid arrays according to the present invention by forming a laminated structure or stack of them interleaved with separator material and with the temporary links of adjacent arrays in registry and then forming a plurality of cuts to sever the temporary links. The present invention also embraces such a laminated structure, each grid which is adapted to be formed into a positive plate being substantially in registry with a grid adapted to be formed into a negative plate in the or each adjacent array. Each grid may carry active electrode material.

The invention may be carried into practice in various ways, and certain specific embodiments will be described by way of example with reference to the accompanying drawings; in which.

Figure 1:
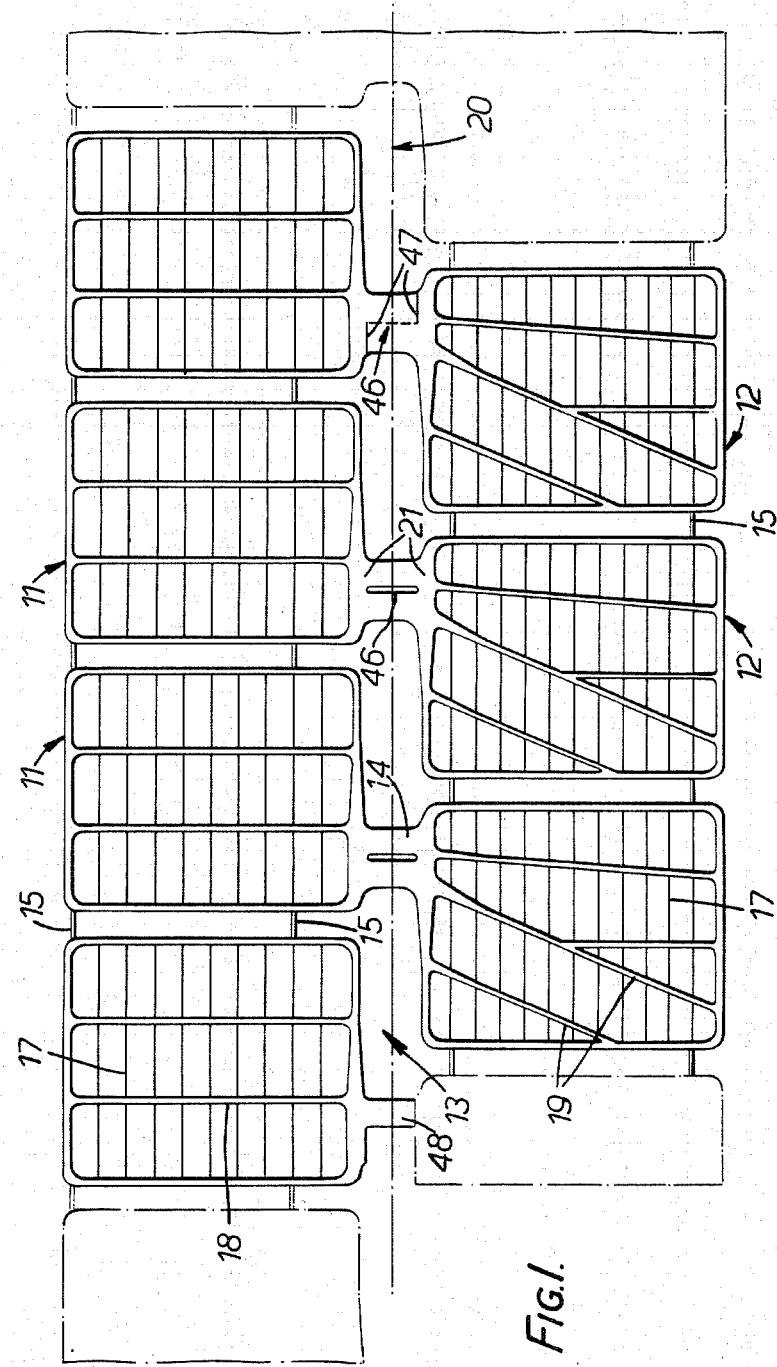
FIG. 1 is a plan view of a continuously cast planar grid array comprising a plurality of interconnected grids for manufacturing electric storage batteries.

The battery grid arrays comprise planar elongate strips of lead or lead alloy mesh which are continually cast on a casting machine generally of the type described in U.S. Pat. No. 4,349,067 published Sept. 14th, 1982, and a short length of one construction of the continuously cast mesh is shown in FIG. 1. The casting is in the form of an array of grids arranged in two spaced parallel lines disposed on opposite sides of what may be termed a median line 20. The grids 11 of one line are adapted to be formed into negative plates and the grids 12 of the other line are adapted to be formed into positive plates. The two lines are separated by a gap 13 but each negative grid is integrally connected to a positive grid by a bridge piece or lug 14 which crosses the gap. The pitch of the lugs 14 is thus equal to the pitch of the grids in the two lines. The grids of each line are spaced apart but interconnected by integral temporary links 15 which give the cast elongate strip some stability but which are severed during manufacture, as will be described below. Each grid is formed with bars 17 extending parallel to the length of the array which are closer spaced in the positive grids than in the negative grids. The negative grids also include bars 18 extending transverse to the length of the array whilst the positive grids include bars 19 generally radiating from the lugs 14. The grid frames are broadened adjacent their point of connection to the lugs 14, as indicated at 21. In general, the bars in the positive grids are wider than those in the negative grids and the thickness of the grids for a typical automotive battery is about one millimeter. After casting, the strip is pasted, that is to say active material is applied to the grids. Thus positive and negative active material is applied to the lines of positive and negative grids respectively.

Batteries are assembled by building up a laminated structure or stack of pasted grid arrays with each line of grids of one polarity situated adjacent to a line of grids of opposite polarity in the array above and/or below it and separated therefrom by a respective strip of compressible fibrous absorbent separator material comprising microfine glass fiber material with the grids of opposite polarity of superposed arrays being in registry and the lines of temporary links 15 thus being in registry also. Mechanical integrity and to a certain extent stiffness of the individual grid arrays is ensured by the temporary links. The temporary links are then severed, using a high speed band saw or the like to separate the laminated structure into individual cell packs. Each cell pack comprises alternating positive and negative plates each of which is one half of a bipolar plate connected to its other half of opposite polarity in the other row by an integral bridge with the exception of every other plate in the two end cell packs which is a unipolar plate.

The laminated structure may be many layers thick and the precise number of layers will be related to the desired current capacity of the battery. In the first third, fifth, etc. layers of the laminated structure the negative grids are on one side and in the second, fourth, etc. layers the negative grids are on the other side of the laminated structure.

In one specific method of battery assembly a strip comprising 144 interconnecting grids of the form shown in FIG. 1 is cast and a strip of separator material is laid on each row of grids and optionally lightly secured thereto. The strip is then severed into 24 arrays of 6 grids each by severing appropriate links 15 and bridge pieces 14 and the separator material overlying the links to be severed. A 24 layer laminated sandwich is then built up and it will be appreciated that this will necessitate the turning of every alternate grid array through 180° to permit the desired registry of plates of alternating polarity to be achieved.

When the laminated structure is separated into individual cell packs a total of four cuts is all that is required, each severing a temporary link 15 in each of the 24 layers will be appreciated that the unipolar plates in the two end cells, that is to say the cell at one end of one row and the other end of the other row, has a bridge piece which was severed prior to the formation of the laminated structure and thus terminates short of the other row.

Figure 2:
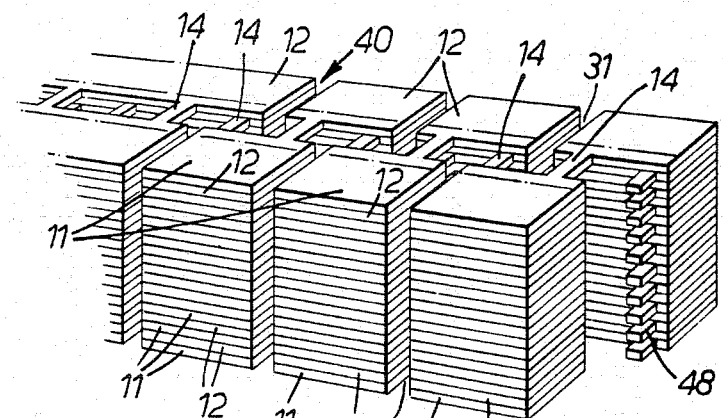
FIG. 2 is a diagram illustrating a stage in the assembly of batteries from such grid arrays.

The resultant laminated structure is shown diagrammatically in FIG. 2 with the cuts severing the temporary links 15 being shown at 31. The bridge pieces 14 are arranged in a plurality of stacks whose spacing in the direction of the length of the rows is of course half that of the individual bridge pieces of a single array as seen in FIG. 1. The grids in the two rows in the first, third, fifth, etc. layers are interconnected by bridge pieces 14 which are in the same longitudinal position along the length of the structure whereas the grids of the second, fourth, etc. layers are interconnected by bridge pieces longitudinally spaced between the other bridge pieces.

As may be seen in FIG. 1 each bridge piece 14 is separated into two by a central gap 46 extending parallel to its length, i.e. transverse to the length of the rows. When the continuously cast strip is separated into individual grid arrays every sixth bridge piece is severed also and this is done by forming two cuts 47 which communicate with the gap 46 to leave two full length but half width terminal connectors, designated 48 in FIG. 2.

After the laminated structure has been built up from individual grid arrays it is clamped to facilitate its separation into individual cell packs by severing the links 15. The connectors 48 are disposed in two vertical stacks and a tapered terminal post 57 is then formed around each such stack, preferably by pouring molten lead into a mould placed around the stack. The cross section of the terminal posts 57 increases such that at their take-off end the cross-section is equal to the aggregate cross-section of each of the stacks of bridge pieces 14, which of course constitute the intercell connectors in the finished battery. The terminal posts are positioned as close as possible to the inner faces of the grids to minimize the internal resistance of the battery.

Figure 3:
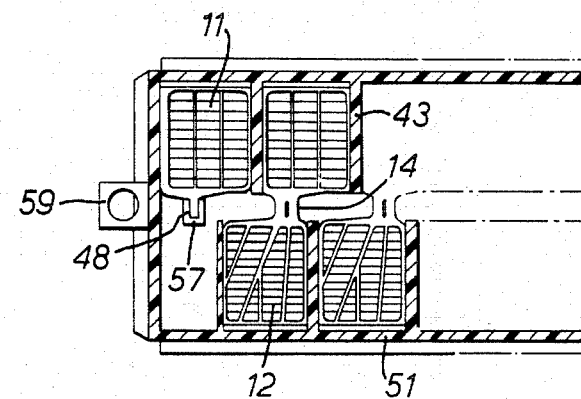
FIG. 3 is a plan view of an assembled 12 volt automotive battery showing only part of one gird array.

The severed structure is then placed as a unit into an outer container 51, seen in FIG. 3, which is of rectangular shape and has integral intercell partitions 43 which extend inwardly from the sides of the container over about half the width of the container and are situated in positions corresponding to those of the cuts 31 in the battery structure, that is to say they are offset longitudinally.

The battery is then filled with electrolyte in any appropriate manner. Either before or after the addition of the electrolyte the terminal connectors 59 on the container are connected to the terminal posts 57 by resistance welding or the like. The battery is then electrolytically formed and the container sealed by a lid.

Figure 4:
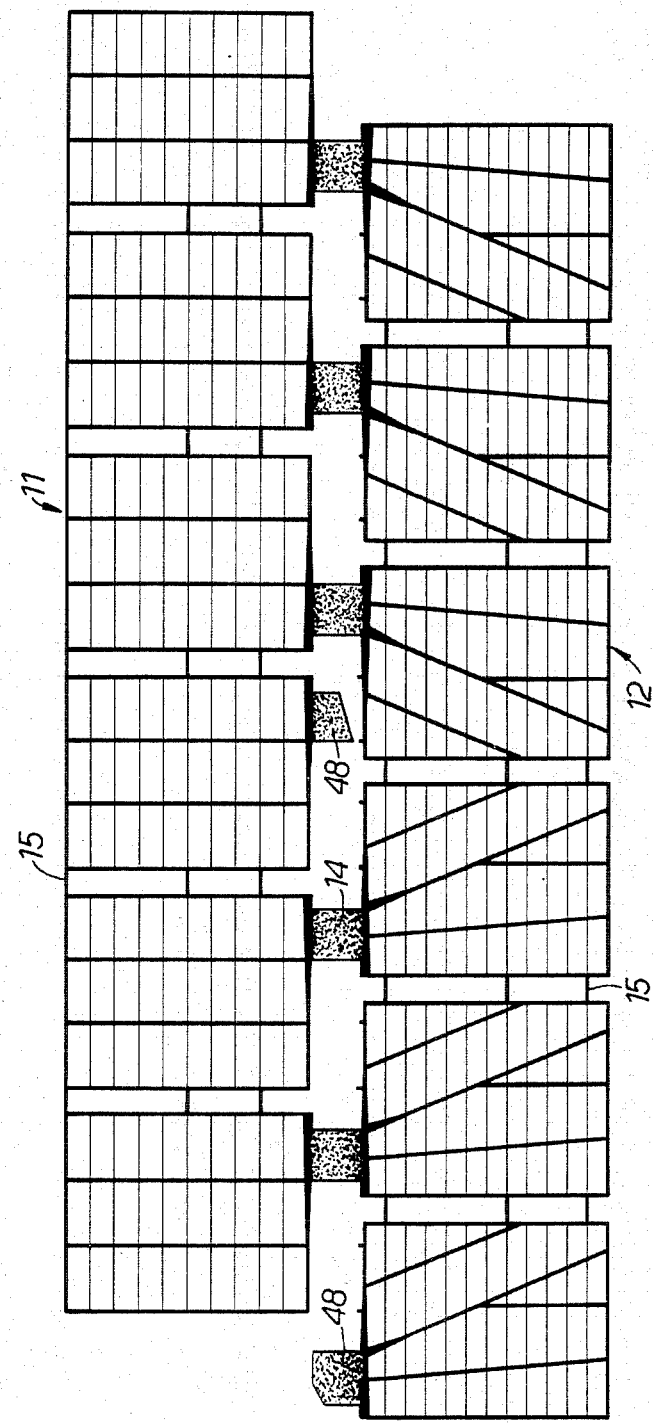
FIG. 4 is a plan view of a modified construction of grid array.

In the construction referred to above it is necessary when assembling a battery to sever certain of the bridge pieces 14 to leave half connectors 48 to which terminal posts are connected. This is avoided in the modified construction shown in FIG. 4 in which those bridge pieces, which in the construction of FIG. 1 are severed, are cast integral with one grid but terminating short of the other row of grids and thus do not require to be severed. These bridge pieces or connectors are designated 48 and may be of simple rectangular shape. Alternatively, the end of these connectors may be inclined to the length of the connectors, either over their whole width, as shown in the right hand connector 48 in FIG. 4, or over only a proportion of their width as shown in the left hand connector 48 in FIG. 4. Such shaping of the connectors 48 is found to facilitate the formation of the terminal pillars, the reason for which is believed to be that the molten metal can more readily flow around the connectors 48 and reliably key to them.

Figure 5:
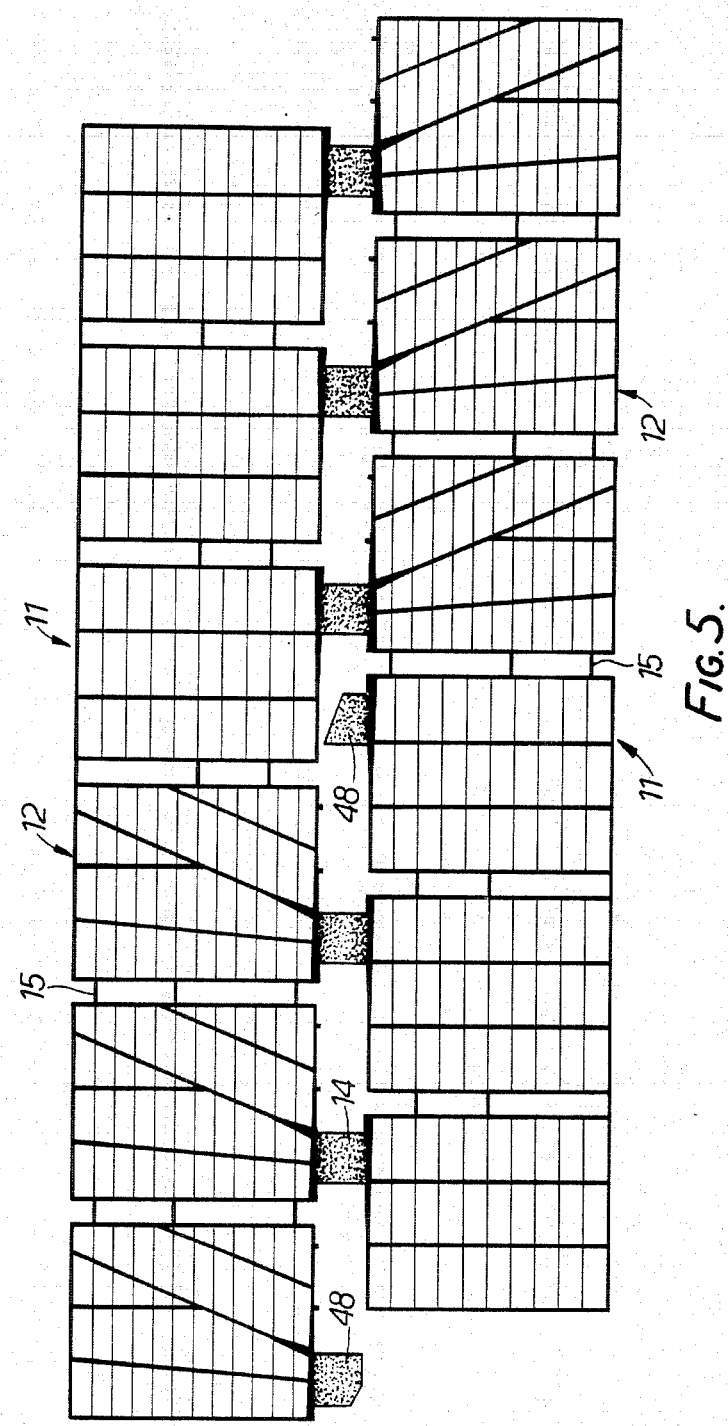
FIG. 5 is a plan view of a further modified construction of grid array.

In the further modified construction of grid array shown in FIG. 5, the casting machine is modified so that each row of grids contains grids of positive type and of negative type which are associated with grids of opposite polarity type in the other row. In this case, each row includes groups of three positive plates alternating with three negative plates and it will be appreciated that this number is appropriate for a six cell battery and will be varied if the battery is to have a number of cells other than six. Certain bridge pieces are again discontinuous and have inclined ends, as described in connection with FIG. 4.

The advantage of this construction is that after separation of the cast strip into individual grid arrays, a laminated structure may be formed without the necessity of having to rotate every alternate array through 180°. On the other hand, manufacturing considerations render it desirable that the grids of each row are pasted with the identical active material and since both rows contain grids of both polarities, both rows are pasted with a universal active paste, that is to say active material paste which may be electrolytically formed into either positive or negative material. Alternatively, each grid is individually pasted with an active material which is specific to the polarity which the pasted plate is to adopt in the finished battery.

Figure 6:
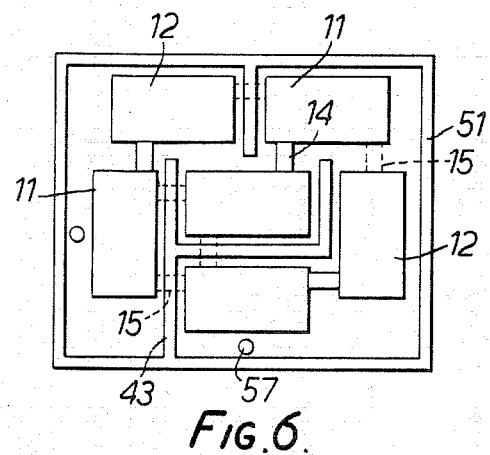
FIGS. 6 and 7 are diagrammatic plan views of a modified construction of battery made from grid arrays according to the present invention showing only the top layer of grids and the layer below the top layer of grids respectively.
Figure 7:
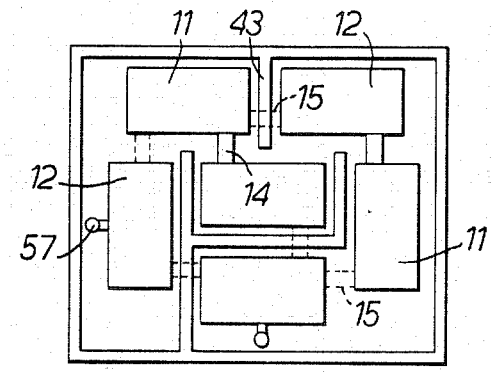

In the modified construction of battery illustrated diagrammatically in FIGS. 6 and 7, the cells are not disposed in two rows but are assymmetrically disposed. The top layer of grids, and every alternate layer beneath it, comprises three bipolar pairs of grids 11, 12 of opposite polarity connected by a respective integral bridge piece 14 and the layer below the top layer and every alternate layer beneath that comprises two bipolar pairs of grids integrally connected by a bridge piece and two unipolar grids connected to respective terminal posts 57. Each cell comprises a stack of pasted grids of alternating polarity separated by a respective strip of separator material and each cell is maintained spaced apart from the or each cell to which it is directly connected by an intercell connector constituted by a stack of bridge pieces 14 by the said intercell connector only. Each cell is separated from the or each adjacent cell to which it is not directly connected by an intercell connector by an intercell partition 43 integral with the container 51.

Such a battery is assembled by forming a laminated structure of two alternating constructions of grid array having the grid configuration shown in FIGS. 6 and 7 respectively. The grids of each array are interconnected by the integral bridge pieces 14 and additionally by sufficient integral temporary links 15, which are shown in dotted lines, to impart adequate structural stability. A total of six cuts is then made to sever the links 15 whilst leaving the bridge pieces 14 and the battery is then completed as described above.

The battery made from grid arrays according to the present invention is preferably of recombination type with no free, unabsorbed eletrolyte and it has been found that it is not necessary to provide intercell sealing between adjacent cells which are connected by an intercell connector because the absorptivity of the separator material is such that the opposed surfaces of the two rows of cells are substantially dry and there is thus no electrolyte available for the conduction of intercell ionic leakage currents. It is however desirable that adjacent cells which are not directly connected by an intercell connector are separated by an intercell partition to prevent relative movement of those cells resulting in their contacting one another thereby shortcircuiting the battery.

Typical compositions for the positive and negative active material pastes are given in the table below:

|  | Positive | Negative |
| --- | --- | --- |
| Grey Oxide (PbO) (Kilograms) | 13.62 | 13.62 |
| Barium sulphate (grams) | — | 68 |
| Carbon black (grams) | — | 23 |
| Lead Stearate (grams) | — | 7 |
| Lignosulphonate sold under the Trade Mark VANISPERSE (grams) | — | 45 |
| Polyester fibre (3 mm) (grams) | 11.5 | 11.5 |
| Water (liters) | 1.68 | 1.53 |
| $H_2SO_4$ (1.4 specific gravity) (liters) | 1.02 | 0.87 |

The sulphuric acid electrolyte added to the battery typically has a specific gravity of 1.24 and is added in an amount of 0.417 litres per kilogram of total active material in the battery.

The battery makes very economical use of lead because all the lead used during casting is inclined in the finished battery except for the small amount of lead forming the interconnecting links 15.

In view of the fact that the plates in the finished battery are "horizontal" and may be retained horizontal at all times during assembly of the battery the plates may be designed primarily for electrochemical efficiency since mechanical strength and in particular bending rigidity is not an important requirement. This enables the plates to be substantially thinner than in a conventional battery which results in a more efficient utilisation of active material and the need for less metallic lead in the battery. This fact coupled with the fact that the intercell connections are integral and necessarily of the minimum theoretical length results in the peak current which the battery may produce being very high, which capability may result in the case of an automotive battery in the battery having a reduced weight and thus reserve capacity for a given cranking power which is a function of the maximum current output.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A grid array for use in providing plates for multi-cell electric storage battery by superimposing a plurality of finite lengths of the grid array to form a laminated structure, the grid array comprising a plurality of spaced grids arranged in a common plane, in two interconnected side-by-side lines, so that each grid in each said length of the array can be formed into one plate for each cell of the battery without altering the spacial relationship between them, with each grid in each line in the array being connected to at least one adjacent grid in the same line by at least one temporary link and with at least one grid in each line in each length of the grid array being connected to an adjacent grid in the other line by an integral permanent bridge piece.

2. The grid array of claim 1, in which each grid in each line in the array is connected to an adjacent grid in the other line by an integral permanent bridge piece.

3. The grid array of claim 2 in which each bridge piece includes an aperture extending in the direction of its length and separating it into two portions.

4. The grid array of claim 1 in which the grids in one line are offset in relation to those in the other line in the direction of the length of the lines, whereby a grid in one line is opposite the temporary links connecting adjacent grids in the other line.

5. The grid array of claim 1, in which all of the grids in each line in each length of the grid array are connected to an adjacent grid in the other line by an integral bridge piece except that one grid in each line of each said length is not connected to a grid in the other line and each such not connected grid has a connecting member which extends toward but terminates short of the other line.

6. The grid array of claim 5 in which each connecting member is shaped such that its free end is inclined to the direction in which the lines extend.

7. The grid array of claim 1 which is elongated and in which the two lines are and substantially parallel.

8. The grid array of claim 1 in which all the grids in one line are adapted to be formed into negative plates and all the grids in the other line are adapted to be formed into positive plates.

9. The grid array of claim 1 in which each line in array includes one or more grids adapted to be formed into negative plates alternating with the same number of grids adapted to be formed into positive plates.

10. The grid array of claim 1 which is cast.

11. The grid array of claim 1 in which certain grids in the array are adapted formed into positive plates and differ from the remainder which are adapted to be formed into negative plates.

12. The grid array of claim 11 in which the grid elements of the grids adapted to be formed into positive plates are closer spaced than those of the grids adapted to be formed into negative plates.

13. The grid array of claim 12 in which the grids adapted to be formed into positive plates include grid elements radiating from the bridge pieces.

14. A laminated structure comprising a plurality of superposed grid arrays as claimed in claim 11, each grid which is adapted to be formed into a positive plate being substantially in registry with a grid adapted to be formed into a negative plate in the adjacent array.

15. The laminated structure of claim 14 in which each grid carries active electrode material and is separated from each grid with which it is in registry by absorbent separator material.

16. The grid array of claim 1 in which each grid carries active electrode material.

17. The grid array of claim 1 which comprises a plurality of grids equal to the number of cells of the battery.

18. The grid array of claim 1 which comprises a continuous length of side-by-side lines of grids that can be subsequently cut into finite lengths, each of which contains a plurality of grids equal to the number of cells of the battery.

19. A method of forming grids for use in providing plates for a multicell electric storage battery by superimposing a plurality of finite lengths of a plurality of interconnected grids to form a laminated structure, which comprises casting the grids in an array comprising a plurality of spaced grids arranged in a common plane, in two interconnected side-by-side lines, so that each grid in each length can be formed into one plate for each cell of the battery without altering the spacial relationship between them, with each grid in each line in the array being connected to at least one adjacent grid in the same line by at least one temporary link and with at least one grid in each line in each length of the grid array being connected to an adjacent grid in the other line by an integral permanent bridge piece.

20. The method of claim 19, in which each grid is connected to an adjacent grid in the same line by one or more of the temporary links and each grid in each line is connected to an adjacent grid in the other line by an integral permanent bridge piece.

21. The method of claim 19, in which each grid in each line in each length of the grid array is connected to an adjacent grid in the other line by an integral bridge piece except that one grid in each line of each said length is not connected to a grid in the other line and each such not connected grid has a connecting member which extends toward but terminates short of the other line.

22. The method of claim 19, in which the grid array comprises a plurality of grids equal to the number of cells of the battery.

23. The method of claim 19, in which the grid array comprises a continuous length of side-by-side lines of grids that can be subsequently cut into finite lengths each of which contains a plurality of grids equal to the number of cells of the battery.

24. The method of claim 23 in which the array is elongated and the two lines are straight and substantially parallel.

* * * * *